April 27, 1926.
D. MacPHAIL
1,582,289
AUTOMOBILE LICENSE PLATE SUPPORT
Filed May 27, 1924
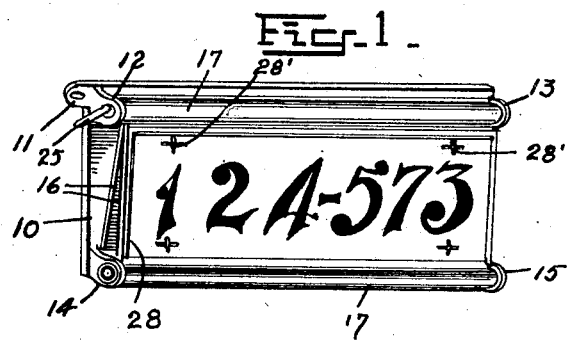
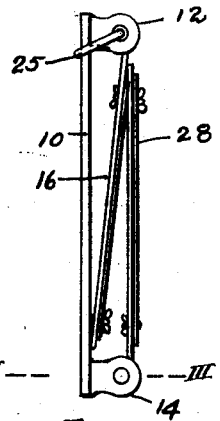
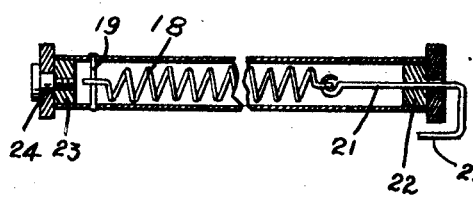
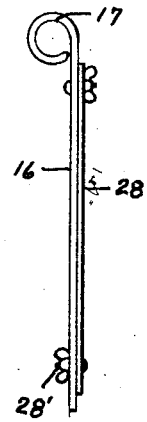
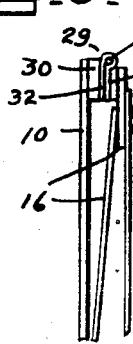
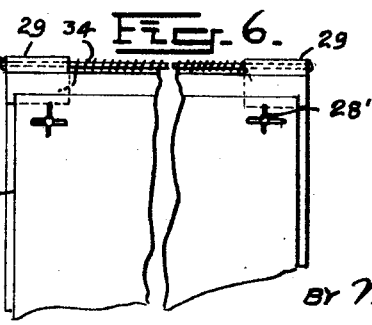
INVENTOR
DOUGLAS MACPHAIL
BY Marvin J O Reynolds Patented Apr. 27, 1926.

1,582,289

UNITED STATES PATENT OFFICE.

DOUGLAS MacPHAIL, OF MILLBURN, NEW JERSEY.

AUTOMOBILE LICENSE-PLATE SUPPORT.

Application filed May 27, 1924. Serial No. 716,092.

*To all whom it may concern:*

Be it known that I, DOUGLAS MACPHAIL, a citizen of the United States, and a resident of Millburn, in the county of Essex and State of New Jersey, have invented a new and useful Improvement in Automobile License-Plate Supports, of which the following is a specification.

The present invention relates to improvements in supports for license plates for automobiles and more particularly to a multiple plate holder.

An object of the invention is to provide a simple and quickly adjustable support for a plurality of license plates.

Another object of the invention is to provide a license plate support adapted for rapid and convenient adjustment for the display of one plate in place of another.

Another object of the invention is to provide a holder for a plurality of license plates arranged to support a plate on display with the displayed surface positioned in accordance with the requirements governing the use of such plates.

A still further object of the invention is to provide a strong and durable holder for a plurality of license plates which may be interchanged for exhibition without disassembling the mechanical elements thereof.

It is well known that an owner of an automobile often finds it necessary to provide himself with license plates for more than one state and when passing from one state to another must either display two such plates or is inconvenienced by the necessity of exchanging for the proper plate.

Certain disadvantages arise when two or more plates are displayed. In the first place, a fastidious owner of an automobile does not like the appearance of several plates and again it is sometimes difficult to properly illuminate both plates in the specified manner.

The present invention therefore aims to provide a holder for one or more plates by means of which one of the plates may be presented to view to the exclusion of the other plate or plates.

The above is accomplished by providing a frame or support with carrier-plates hinged to the support and adapted to fold one upon the other. The carrier-plates are so constructed that a license-plate may be attached to each carrier, the plate on the outermost carrier being presented to view.

The carriers may be held in tensional contact with each other and adapted to be adjusted and folded with any desired carrier exposed.

In accordance with my invention therefore, I provide a plurality of carrier plates pivotally associated with a bracket or supporting plate which may be secured to a vehicle in the usual manner; the carrier plates being so constructed as to receive and support licenses or other tags with one of said tags exposed and positioned in a vertical plane so as to be in the required range of vision from various points as required by rules which regulate the disposition of such tags on vehicles.

The invention will be more fully understood by reference to the accompanying drawing in which;

Fig. 1 is a perspective view of an embodiment of my invention showing an exposed license tag;

Fig. 2 is an end view of the holder shown in Fig. 1;

Fig. 3 is a longitudinal enlarged sectional view of the holder taken on line III—III in Fig. 2;

Fig. 4 is an end view of a carrier plate having a license tag secured thereto;

Fig. 5 is an edge view of a modified form of the device; and,

Fig. 6 is a front view of the modified form of the device shown in Fig. 5.

The invention may be practiced by providing a backing or supporting plate 10 with lugs 11 or other suitable means for securing it to a vehicle. The supporting plate may be of rectangular form and provided with two pair of offset or projecting bearings 12, 13, 14 and 15 respectively. A carrier plate 16 may be positioned between each pair of the bearing and pivoted thereon. The carrier plates may be constructed as shown in Fig. 4 with a tubular portion 17 adjacent an edge and adapted to house a helical spring 18 having one end secured to a pin 19 in the tubular portion and the opposite end connected with a rod 21. The rod may extend from an end of the tubular portion, a suitable bushing 22 being provided to properly support the tubular portion in conjunction with one of the bearings through which the rod 21 may pass. The opposite end of the tubular member is provided with a plug 23 to which a stud 24 is threadedly connected, the shank of the stud being disposed in a bearing of the support 10. A carrier may thus be hinged between each pair of bearings and the rod 21 may be extended and bent so that an end 25 thereof, may be positioned behind the plate 10 or suitably secured thereto so that the carrier plates may be tensionally urged toward the support 10 by means of the elasticity of the spring under the torsional stress which may readily be produced therein by a rotary movement of the rod 25. The spring may be wound or unwound to vary the force acting to maintain the plates in close relation to each other. A license tag or plate may be secured to each of the carrier plates by means of wing-nuts and bolts extending through slots in the support and in the plates as commonly provided.

The modification of the device as shown in Figs. 5 and 6 includes support 10 having a hinge secured to an offset block 30 to provide for the vertical disposition of the plate presented to view. The hinge portion of the device may comprise members 31 and 32 movable on a pintle 33. A helical spring 34 having one end in contact with the member 32, may be provided to normally urge the carrier plate toward the support 10 and thus hold the carriers in position. Thus each carrier plate will automatically be moved toward the support 10 or against the other carrier plate when lapped therover, and the outer carrier and consequently the license tags to be exhibited, will be held in the desired vertical position.

By reason of the tensional means for retaining the carrier plates the same are firmly held in their proper relative positions and their resilient association avoids the noises due to vibration on account of lost motion or loosely connected parts.

It will be appreciated that by reason of the present invention a neat appearing and durable multiple license tag holder is provided and that one tag may be substituted for another in a rapid and convenient manner. Furthermore, the simplicity of the operable elements of the device makes it desirable from an economical standpoint.

Although a preferred embodiment of the invention is shown and described herein, it is to be understood that other modifications may be made therein and that such modifications as lie within the scope of the appended claims are considered as within the spirit of my invention.

What is claimed is:

1. An automobile license plate holder comprising a supporting member, a plurality of license plate-carriers, bearings on said supporting-member, said carriers being adapted to lap one upon the other, said bearings being offset from said support a sufficient distance to position the outermost carrier substantially parallel to said support and means for holding said carriers in tensional engagement.

2. An automobile license plate holder comprising a supporting member, a plurality of license plate-carriers, bearings on said supporting-member, said carriers being adapted to lap one upon the other, said bearings being offset from said support a sufficient distance to position the outermost carrier substantially parallel to said support, a helical spring disposed between the bearings upon which the respective carriers are mounted, means for creating a torsional stress in said spring and means whereby said stress serves to maintain the carriers in their proper relative positions.

3. An automobile license plate holder comprising a rectangular supporting-member, a plurality of license plate carriers adapted to be positioned one upon the other, bearings at the corners of said member, tubular portions along an edge of each of said carriers, helical springs in said tubular portions, an end of each of said springs being secured to the carrier, the opposite ends of said springs being connected to rods extending through said bearings at the corners of said supporting member, the ends of said rods adapted to engage with said supporting members to hold the carriers adjustably in position and means for securing license plates to said carriers.

4. An automobile license plate holder comprising a rectangular supporting-member, a plurality of license plate carriers adapted to be positioned one upon the other, bearings at the corners of said member, tubular portions along an edge of each of said carriers, helical springs in said tubular portions, an end of each of said springs being secured to the carrier, the opposite ends of said springs being connected to rods extending through said bearings at the corners of said supporting member, the ends of said rods adapted to engage with said supporting members to hold the carriers adjustably in position, said bearings being offset a sufficient distance from said supporting members to position the outer carrier substantially parallel to said supporting member and means for securing license plates to said carriers.

5. An automobile license plate holder comprising a supporting member, a plurality of sets of bearings on said member, a plurality of license plate-carriers, pivotal connections between each set of bearings and a carrier, said sets of bearings being so positioned as to permit one plate to cover another plate, the covered plate serving in conjunction with the bearings to position the exposed plate in substantially parallel relation to the supporting-member.

In testimony whereof, I have hereunto subscribed my name this 25th day of April, 1924.

DOUGLAS MacPHAIL.